March 29, 1927.

G. W. SEIBERLING 1,622,546

METHOD OF SPLICING SOLID TIRE STOCKS

Filed June 11, 1925

Inventor
GEORGE W. SEIBERLING
Attorney

Patented Mar. 29, 1927.

1,622,546

UNITED STATES PATENT OFFICE.

GEORGE W. SEIBERLING, OF DETROIT, MICHIGAN, ASSIGNOR TO MORGAN & WRIGHT, OF DETROIT, MICHIGAN, A CORPORATION OF MICHIGAN.

METHOD OF SPLICING SOLID-TIRE STOCKS.

Application filed June 11, 1925. Serial No. 36,336.

This invention relates to methods of manufacturing solid tires for vehicles, but more particularly to improvements in the method of splicing solid tire stock upon a metal rim, and has for its primary object to secure a well knit joint between the ends of the stock.

Further objects of my invention are to eliminate opening of the splice after vulcanization, to increase the contact area at the splice, to confine the effect of the presser roll to a comparatively small area in the spliced portion at any instant, and in general to provide an improved method of making solid tires.

The many other objects and advantages of my invention will be better understood by reference to the following specification when considered in connection with the accompanying drawing illustrating a selected embodiment thereof, in which.

One method of making solid tires consists in first tubing the uncured stock in a continuous strip having substantially the same cross-section as the finished tire, and then cutting the strip into slabs of predetermined length. These slabs are carefully weighed in order to get the proper amount of stock in the tire. The slab is then applied to a rim and the ends spliced together to form a complete annulus. The uncured tire thus formed is next delivered to a mold and vulcanized.

It is customary in practice to cut the stock in a manner to provide beveled or skived ends on the slab and this is primarily for the purpose of facilitating the splicing of these ends when the slab is placed upon a rim. This bevel has heretofore been either transverse or longitudinal. By transverse bevel is meant an oblique disposition of the end face of the slab relative to the sides thereof, and by longitudinal bevel, a like disposition of this face relative to the top and bottom faces of the slab. A joint provided by either of these bevels is the weak point in the tire and it frequently happens that this joint opens immediately after vulcanization.

I have devised an improved method of cutting the stock which provides a well knit joint and very materially facilitates the splicing operation. This consists in cutting the stock in a combined transverse and longitudinal bevel as distinguished from either of these separately. The term "combined transverse and longitudinal bevel" indicates a cut which is oblique to the sides and to the top and bottom faces of the strip or slab.

Figure 1:
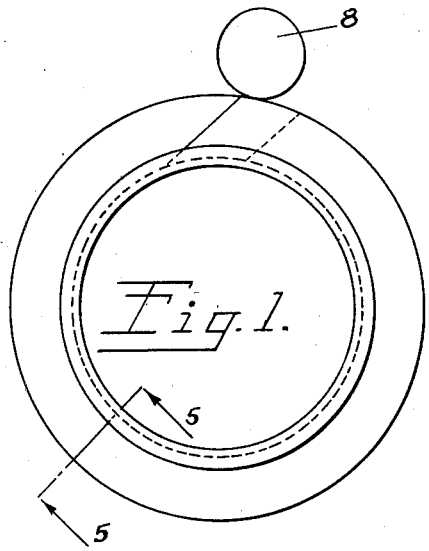
Fig. 1 is an elevation of a completed tire manufactured in accordance with the principles of my invention.
Figure 2:
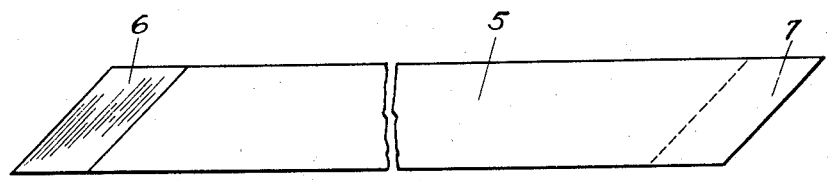
Fig. 2 is a side elevation of a slab of stock cut from the strip and ready to be placed upon a metal rim.
Figure 3:
Fig. 3 is a plan view of the slab shown in Fig. 2.
Figure 4:
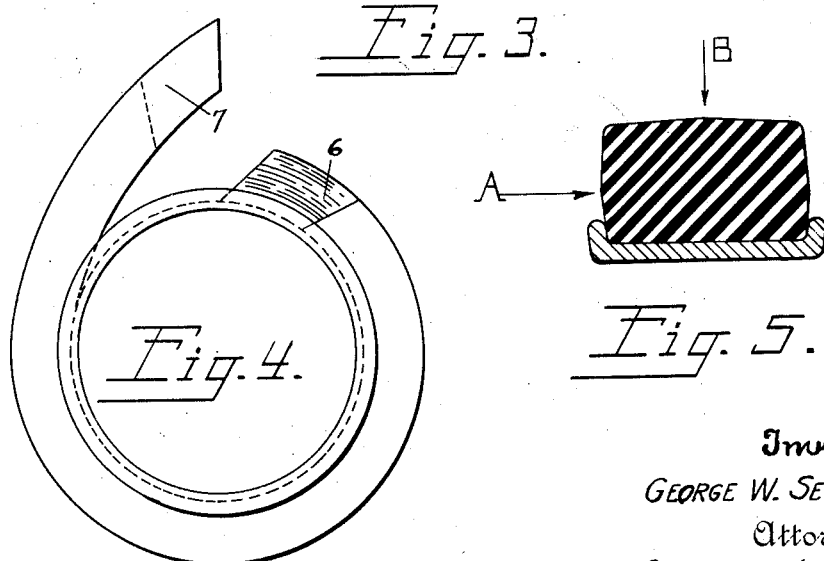
Fig. 4 illustrates the method of placing the cut slab upon the rim.
Figure 5:
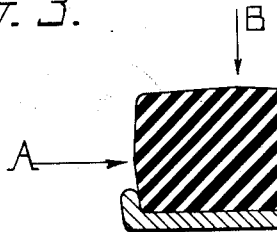
Fig. 5 is a transverse section on the line 5—5 of Fig. 1.

Referring to the drawing, the slab of stock 5 has been cut from a tubed strip by my improved method and the end faces 6 and 7 of the slab have the combined transverse and longitudinal bevel, the bevels being reversed at the opposite ends so that these ends will fit together when the slab is placed upon the rim. The form of the joint is shown in Fig. 1 of the drawings. The cut slab is applied to the rim in the manner indicated in Fig. 4.

After the slab has been placed upon the rim in the manner described, it is customary to apply pressure to the periphery of the slab by means of a roller as 8 though other means of manipulation are sometimes used. The tire is revolved so that the roller contacts with all portions of the circumference. The pressure applied in this manner has a progressive action at the splice which tends to knit the splice firmly because the effect of the pressure roll is confined to a comparatively small portion of the area in the splice at any instant.

With my improved form of bevel the contacting area at the splice is considerably larger than would be the case if the skive or bevel was either transverse or longitudinal. This is a very advantageous feature. Furthermore in the case of the transverse bevel alone, the pressure of the roll has very little effect in setting the splice together. When the ends of the stock are beveled longitudinally only, the progressive action of the presser roll is distributed through the width of the tread stock and this tends to cause a sliding action between the contacting ends which does not provide a firm splice such as is secured with my improved bevel.

While I prefer to tube the stock and cut the slabs therefrom in the manner described, it is obvious that these slabs may be produced in a variety of different ways.

It will be evident from the foregoing description that my improved method of manufacturing solid tires is simple and economical and the finished tire is capable of standing the rough usage in service.

Having thus described my invention, what I claim and desire to protect by Letters Patent is:

1. The method of preparing stock for the making of solid tires which consists in tubing the stock in a continuous strip and severing the strip at predetermined longitudinal intervals by cuts directed to form a combined transverse and longitudinal bevel on the cut edges of the severed sections.

2. The method of preparing uncured rubber stock for the making of solid tires which consists in tubing the stock in a continuous strip having substantially the cross section of the tire, and severing the strip at predetermined longitudinal intervals, by cuts directed to form a combined transverse and longitudinal bevel on the cut edges of the severed sections.

3. The method of making a solid tire which consists in tubing uncured stock in a continuous strip, severing the strip at predetermined longitudinal intervals by cuts directed to form combined transverse and longitudinal bevels on the cut edges of the severed sections or slabs, placing the slab over a rim with said cut edges abutting, joining said abutting edges to form a complete annulus, and vulcanizing.

4. The method of making solid tires which consists in tubing uncured stock in a continuous strip, severing the strip at predetermined longitudinal intervals by cuts directed to form combined transverse and longitudinal bevels on the cut edges of the severed sections or slabs, placing the slab on a rim and splicing said cut edges to form a complete annulus, and then placing the tire in a mold and vulcanizing.

5. The method of making solid tires which consists in tubing uncured stock in a continuous strip having substantially the cross-section of a finished tire, severing the strip at predetermined longitudinal intervals by cuts directed to form combined transverse and longitudinal bevels on the cut edges of the severed sections or slabs, placing one of these slabs upon a rim with the opposite cut edges of the slab in contact, manipulating the slab to close the joint between said edges, and vulcanizing.

6. The method of making solid tires which consists in tubing uncured stock in a continuous strip having substantially the cross-section of the finished tire, severing the strip at predetermined longitudinal intervals by cuts directed to form combined transverse and longitudinal bevels on the cut edges of the severed sections or slabs, placing one of the severed slabs about a substantially rigid rim with the opposite cut edges of the slab abutting, subjecting the slab to pressure to cause the same to fit tightly about the rim and to close the joint between said edges, and vulcanizing.

7. The method of making solid tires which consists in forming uncured rubber compound into an elongated slab having each of its ends transversely and longitudinally beveled, the bevel being reversed at the opposite ends, placing the slab about a substantially rigid rim and splicing the ends to form a complete annulus, and vulcanizing.

Signed at Detroit, county of Wayne, State of Michigan, this 5th day of June, 1925.

GEORGE W. SEIBERLING.